US00RE40760E

(19) United States
(12) Reissued Patent
Krug et al.

(10) Patent Number: US RE40,760 E
(45) Date of Reissued Patent: Jun. 23, 2009

(54) REGULATOR FOR AUTOMATICALLY ADJUSTING THE LENGTH OF AN ACTUATING LINK

(75) Inventors: Michael Krug, Asslar (DE); Thomas Schmidt, Hungen/Rodheim (DE)

(73) Assignee: Kuster & Co., GmbH, Ehringshausen (DE)

(21) Appl. No.: 10/200,200
(22) Filed: Jul. 22, 2002

Related U.S. Patent Documents

Reissue of:
(64) Patent No.: 6,244,129
Issued: Jun. 12, 2001
Appl. No.: 09/208,497
Filed: Dec. 10, 1998

U.S. Applications:
(63) Continuation of application No. PCT/EP98/02096, filed on Apr. 9, 1998.

(30) Foreign Application Priority Data

Apr. 11, 1997 (DE) ..... 197 15 304
Aug. 9, 1997 (DE) ..... 197 34 572

(51) Int. Cl.
*F16C 1/22* (2006.01)
*F16C 11/06* (2006.01)
*B64C 13/30* (2006.01)
*B60T 7/10* (2006.01)
*F16J 1/16* (2006.01)

(52) U.S. Cl. ..... 74/501.5 R; 403/152
(58) Field of Classification Search ..... 74/501.5 R, 74/502.4, 502.6, 506, 471 XY; 188/69, 82.7, 188/204 R; 403/150, 152, 161, 164
See application file for complete search history.

(56) References Cited

U.S. PATENT DOCUMENTS 2,810,300 A * 10/1957 Pigford ..... 74/501.5 R
2,912,072 A * 11/1959 Jones ..... 188/204 R
3,433,089 A * 3/1969 Geyer ..... 74/501.5 R
3,786,689 A * 1/1974 Houk ..... 74/471 XY
4,198,877 A * 4/1980 Huling ..... 74/500.5
4,662,236 A * 5/1987 Kobayashi ..... 74/501.6
4,682,760 A * 7/1987 Baumgarten ..... 254/199
4,776,543 A * 10/1988 Stableford ..... 244/232
4,889,007 A * 12/1989 Senft et al. ..... 74/506
4,938,304 A * 7/1990 Yamaguchi et al. ..... 180/197
5,235,867 A * 8/1993 Wortmann et al. ..... 74/501.5 R
5,301,563 A * 4/1994 Van Zanten et al. ..... 74/501.5 R
5,485,762 A * 1/1996 Rothman ..... 74/501.5 R
5,690,193 A * 11/1997 Baumann et al. ..... 188/72.9
5,907,977 A * 6/1999 Huebner et al. ..... 74/501.5 R

FOREIGN PATENT DOCUMENTS

DE 3741530 A1 * 6/1989
DE 3741530 * 6/1989
DE 4302250 A1 * 7/1994
DE 19546931 A1 * 2/1997
DE 19546931 * 2/1997

* cited by examiner

*Primary Examiner*—Vinh T. Luong
(74) *Attorney, Agent, or Firm*—Berenato, White & Stavish

(57) ABSTRACT

A regulator (27) automatically adjusts a drive cable (3, 4) or Bowden cable (15) to drive a vehicle brake by means of a drive element such as a brake lever or a handbrake lever (21), the regulator (27) comprising two pivotally supported resetting arms (1, 9) prestressed by at least one spring element (13) and which can be connected each to the drive cable (3, 4) resp. leading to the brakes, further comprising a blocking system (28) to block the pivoting motion about a common pivot axis (19) of the resetting arms (1, 9) in case of actuation of the drive element coupled by a Bowden cable (15) to the resetting arms (1, 9). At least one guidance inset (7) is seated in irrotational manner in a clearance (5) of a resetting arm (1) as a pivot bearing for the other resetting arm (9), the latter being supported at the guidance inset (7) so as to be pivotable about the pivot axis (19) and the blocking system (28) is supported at or in the guide inset (7) so as to be radially displaceable about the pivot axis (19).

18 Claims, 4 Drawing Sheets

REGULATOR FOR AUTOMATICALLY ADJUSTING THE LENGTH OF AN ACTUATING LINK

Matter enclosed in heavy brackets [ ] appears in the original patent but forms no part of this reissue specification; matter printed in italics indicates the additions made by reissue.

*This application is a continuation of PCT/EP98/02096, filed Apr. 9, 1998 with the European Receiving Office.*

BACKGROUND OF THE INVENTION a) Field of the Invention

The invention relates to a regulator for automatically controlling length adjustment of a drive cable or Bowden cable to drive a vehicle brake by means of a drive element such as a brake lever or handbrake lever.

b) Description of Related Art

In general drive links/cables incur the drawback of slightly differing in length at manufacture and thereby precise length adjustment must be undertaken, especially when used as brake drive means. Moreover the drive cables elongate during operation and for instance the play of the brakes per se requires that the drive cables are adjusted during service life.

Such a regulator already is known from the German patent document 37 41 530 A1. This document proposes automatic adjustment in the cable lengths of parking brakes in the form of a resetting device fitted with an elongated transmission member which can be adjusted by a traction cable for the purpose of brake actuation, a double-arm adjusting yoke being mounted to said transmission member and being fitted with cables each leading to a wheel brake. The lever arms of the regulator yoke are supported in mutually pivotable manner, being prevented by a blocking device from transmitting braking force in one of the pivoting directions. A stressing means is used to constantly pivot the lever arms of the adjusting yoke into the other direction. In particular there is a transmission link between the U-legs of which a double-arm support yoke is supported so as to be pivotable about a stationary pivot axis. The support yoke consists of two yoke members, mounted in a common plane and each forming one lever arm, that are pivotable about a pivot axis and project from a longitudinal side of the transmission member. A stressing member is used to pivot the yoke members to adjust for elongations of the cables. This member preferably consists of a compression spring resting by each spring end against one of the yoke members. A locking device blocks the yoke members from rotating, ie pivoting opposite the tensioning direction of the cables. This locking device comprises a blocking pawl which is supported in pivotable member, and furthermore in radially displaceable manner, relative to the pivot axis, said pawl serving as a rest for a return spring biasing the pawl towards its blocking position. A blocking toothing present at a yoke member at a peripheral sector is associated with the blocking pawl. Accordingly the pawl operates in step-wise manner and it will enter a new tooth-gap in the ratchet only after a predetermined elongation of the cable and then manually locks the yoke members in a new relative position. Therefore locking comes about because the pawl in its engaging position can rest on a stop surface on one or both sides of the yoke member and because the yoke member is prevented from clockwise rotation by the cable. The design of this known adjusting device is comparatively complex and furthermore it is bulky.

The German patent document 43 02 250 C2 furthermore describes a vehicle brake system fitted with a cable tensioning means for a parking brake cable comprising a locking device which, when in the locked state, can be actuated in such manner that it will initially keep the adjusting ratchet locked relative to the lever against the biasing force of an adjusting spring in order to allow in this manner connection of the cable to the adjusting ratchet.

A further adjusting system is known from the German patent document 195 46 931 A1. To achieve automatic length adjustment, the adjusting system comprises an essentially box-shaped seat having two spring-loaded detent segments, detent levers or the like which are pivotable about different axes and which each can be connected by a drive cable, in particular a Bowden cable. This seat furthermore houses a blocking element displaceable therein and which upon actuation of the drive cable or Bowden cable can be moved from a position unlocking the detent segments into a position locking them. Even though this known adjusting system has been found practical, more compactness is desired. In this respect it must always be borne in mind that the space available for the adjusting system, for instance in the vicinity of the drive lever itself, or in that region of the vehicle wherein the drive cables branch out to the two rear-wheel brakes, is small.

SUMMARY OF THE INVENTION

The objective of the present invention is to provide a regulator of the initially cited kind that offers compactness and automatic length adjustment of the drive cable.

This problem is essentially solved in the invention by the regulator having the initially cited features in that at least one guidance inset is irrotationally received in a clearance of one resetting arm and acts as a pivot bearing for the other resetting arm which is supported at the guidance inset to be pivotable about the pivot axis and in that the blocking system is supported at or in the guidance inset in radially displaceable manner relative to this pivot axis.

This design creates an ultra-compact regulator which moreover offers simple manufacture. These features are achieved in that the pivot bearing is composed of elements mounted at the very resetting arms, namely the guidance insets which not only form the pivot bearing for both resetting arms but furthermore another bearing for the radially displaceable blocking system. This design also eliminates the need to spring-load the blocking system. Therefore this design not only offers an ultra-compact regulator, but also simplicity in pivoting motion of the resetting arms by means of the integrated pivot bearing, and in addition, when the drive element is actuated, the blocking system supported at or in the guidance inset is radially displaced relative to the pivot axis and thereby reliable affixation of the resetting arms is assured during the actuation of the drive element.

It was found advantageous in this respect to integrate the blocking system in a clearance or a like seat of the resetting arms or of the pivot bearings. This feature assures that upon actuation of the drive element the resetting arms are reliably affixed in their relative positions. On the other hand further regulator compactness is achieved by integrating the blocking system in a seat of the resetting arms or of the pivot bearing.

In another advantageous embodiment of the invention, the blocking system assumes the form of a blocking segment with other teeth and is displaced at one resetting arm radially to the pivot axis.

Preferably the other resetting arm is fitted with an inside toothing which, when the drive element is actuated, engages the said outer toothing.

Preferably the blocking system is connected to a bolt of the like which is adjusted directly by the drive element or for instance by means of a pivot lever.

In another advantageous design of the invention, the resetting arms or the pivot bearing are held with play at the bolt or the like.

Installation of the regulator of the invention on the premises of the automotive manufacturer is facilitated in that the resetting arms each are fitted with a borehole and can be fixed in position in a delivery position against the spring-loading of the element by a stop pin inserted into this borehole. Following assembly of the regulator, the stop pin is removed from the boreholes and thereby the regulator is released for operation.

Lastly it was found advantageous that a stop be associated with the regulator to detach or disengage the blocking system when the drive element is inactivated. Thereby it is possible to adjust the two resetting arms in both directions of rotation. Such bidirectional adjustment will be especially advantageous for instance when, on account of weather, the brake shoes are sticky or exposed to frost, and undesired and possibly irreversible adjustment is averted in such manner.

BRIEF DESCRIPTION OF THE DRAWINGS

Further advantages and applications of the present invention are elucidated in the following description of embodiments of the invention and in relation to the attached drawings.

DETAILED DESCRIPTION OF THE PREFERRED EMBODIMENTS

Figure 1A:
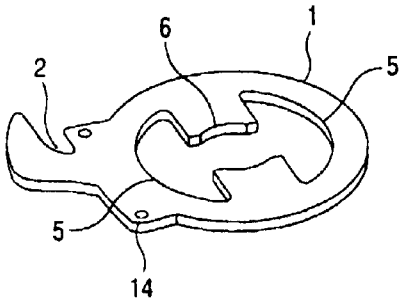
FIGS. 1a–1e are schematic and exploded perspective views of the constitution of assemblies of the resetting arms, pivot bearing and blocking system of a first embodiment of the invention.

The regulator 27 (see FIG. 2a) comprises a first resetting arm 1 composed of two parts. The resetting arm 1 comprises a retention means 2 to affix the drive cables 3 or 4 and furthermore two arcuate recesses 5 which in the present embodiment are connected by a central borehole 6.

Figure 1B:
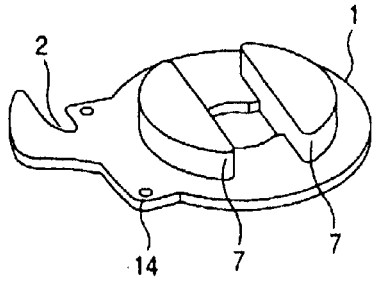
Figure 1C:
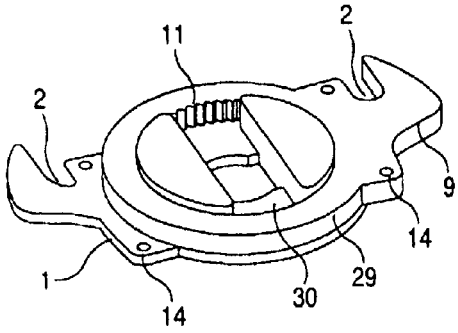
Figure 1D:
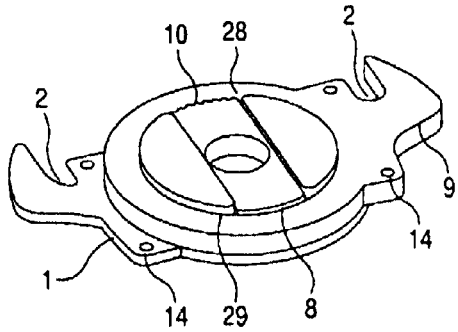
Figure 1E:
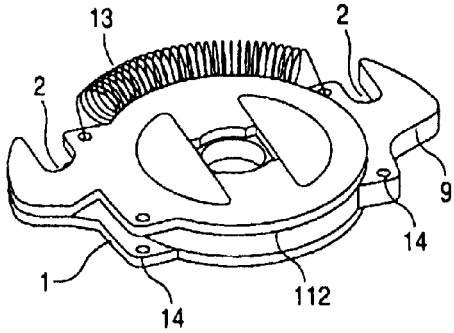

As shown by FIG. 1b, in the resetting arm 1, the clearances 5 of the present embodiment are fitted with two arcuate guidance insets 7 acting as a pivot bearing 29 and projecting axially from the planar setting arm 1. The second resetting arm 9 is plugged onto or received on these guidance insets 7 (FIG. 1c). The recess 30 remaining between the two guidance insets 7 receives a blocking element 8 acting as the locking system 28, and the outer toothing 10 of the blocking element 8 engages the inside toothing 11 on the second resetting arm 9 when the brake is actuated. The remaining portion of the regulator 27 is in the form of a part 112 comparable to the resetting arm 1 of FIG. 1a, as a result of which the two radially outward hooks of the resetting arm 1 and of the part 112, which in the present embodiment together form the retention means 2 for the drive cable 3 or 4, are bent together.

The second resetting arm 9 also comprises a retention means 2 for a drive cable 3 or 5. The two resetting arms 1 or 9 are loaded by a spring 13 biasing them into relative pivoting motion.

The resetting arm 1 also may be made integral.

Again, instead of using one spring 13, separate springs acting on each resetting arm may be used, and be linked to a mating support. Illustratively the tension spring 13 may also be replaced by a torsion spring.

Figure 2A:
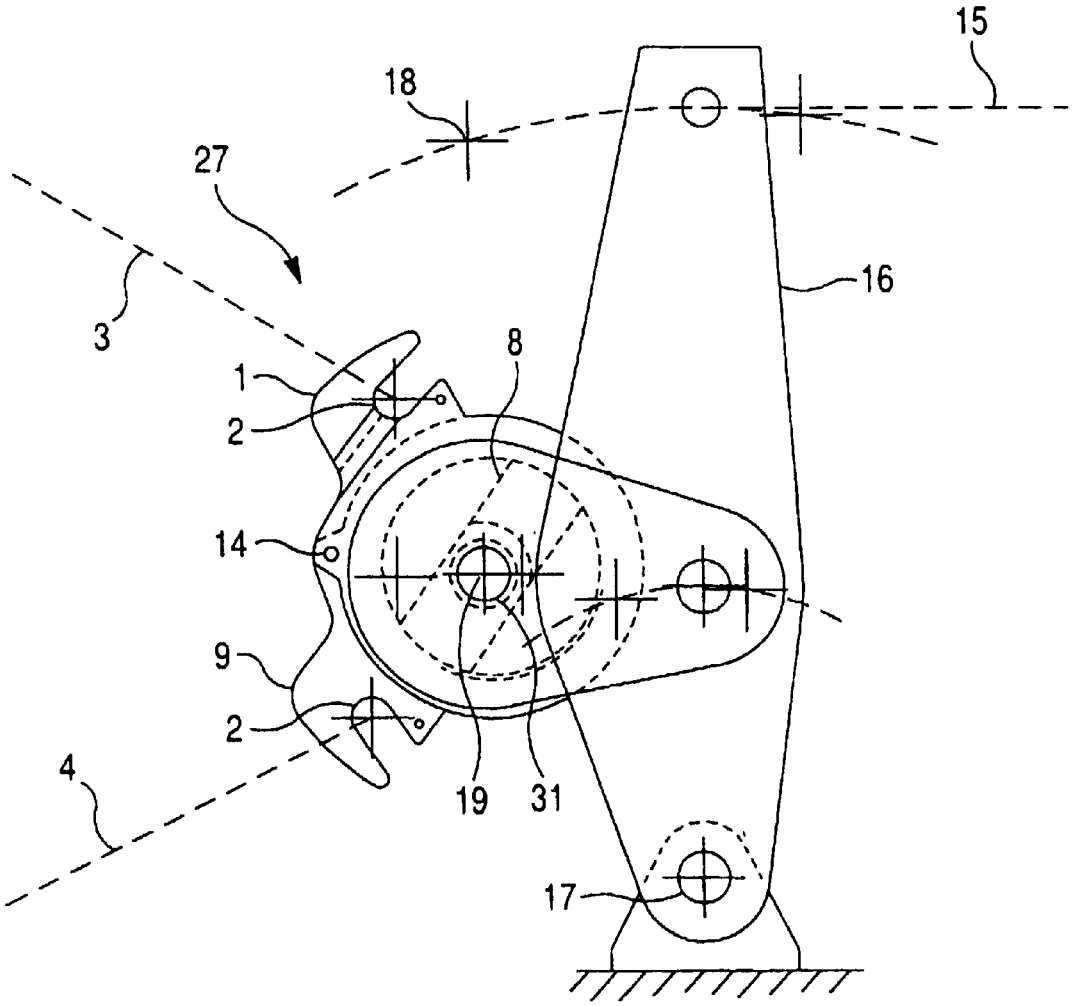
FIG. 2a shows the regulator of the invention in its delivery-to-factory condition wherein the resetting arms are locked in the delivery-to-factory condition by a stop pin passing through boreholes.
Figure 2B:
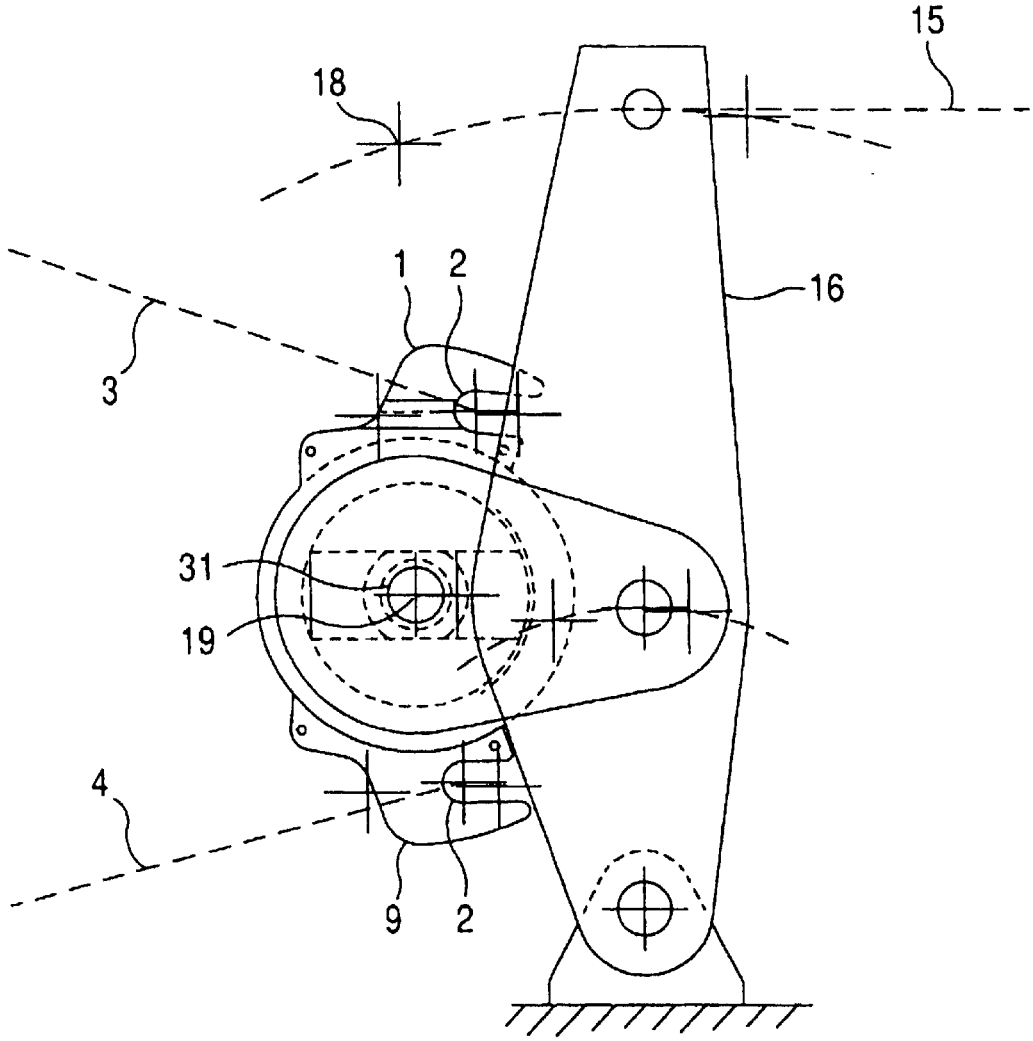
FIG. 2b shows the regulator of FIG. 2a in various positions following removal of the stop pin.

FIG. 2a shows the delivery-to-factory condition of the regulator 27. The two resetting arms 1, 9 are moved into a mutual pivoting position by means of a stop pin inserted into the borehole 14 against the force of the spring element 13 to allow conveniently hooking the cables 3, 4 into the recesses 2.

In the embodiment shown here, the brake cables 3, 4 are actuated by a handbrake-lever Bowden cable 15 and connected to a pivot lever 16. The pivot lever 16 is pivotally supported in an eye 17 present at the automobile body side.

After the stop pin has been removed from the borehole 14, the tension spring 13 pivots the two resetting arms 1, 9 in such manner that all slack is removed from the assembly, for instance from the Bowden cables 4 and 3. If now the handbrake lever is actuated and the pivot lever 16 is pivoted by the Bowden cable 15 in the direction of the handbrake lever or the brake drive element, first the adjustable blocking segment 8 is driven, the toothing 10 implements locking and the adjusting system is correspondingly driven into the blocked or locked state of the resetting arms 1, 9. If next the brake drive element or the handbrake lever is released again, the pivot lever 16 moves into the position denoted by 18. Should there be at that time slack in the system, then the two resetting arms 1, 9 will be pivoted by the force of the spring element 13 until all slack has been eliminated from the system.

In case of unequal elongation of the two Bowden cables 3, 4, there will take place a rotation of the resetting arms 1, 9 about the pivot axis 19 and thereby length adjustment will take place also in this operational condition. This feature also applies to the case of tolerance-conditioned unequal brake reactions.

Figure 3C:
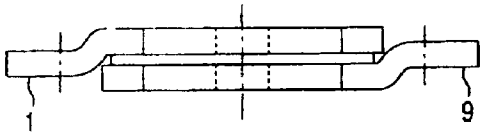
FIG. 3c is a schematic top view of the resetting arms.
Figure 3A:
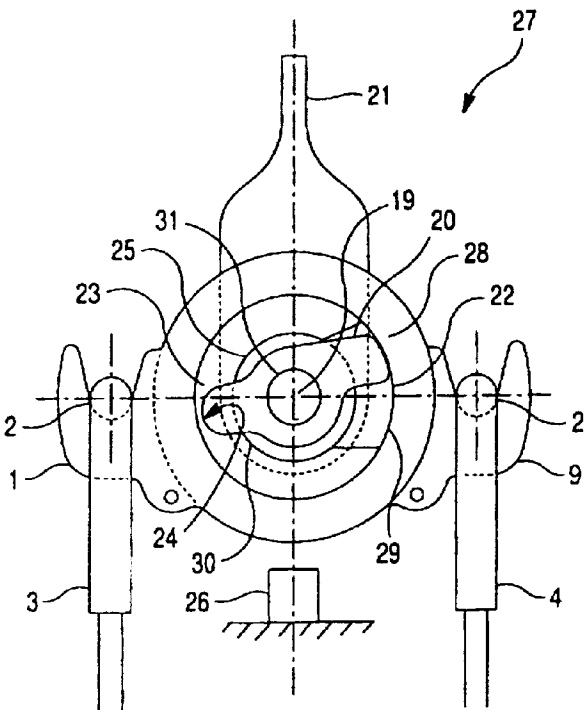
FIG. 3a shows a second embodiment of the regulator of the invention with the blocking system in the clamped position.
Figure 3B:
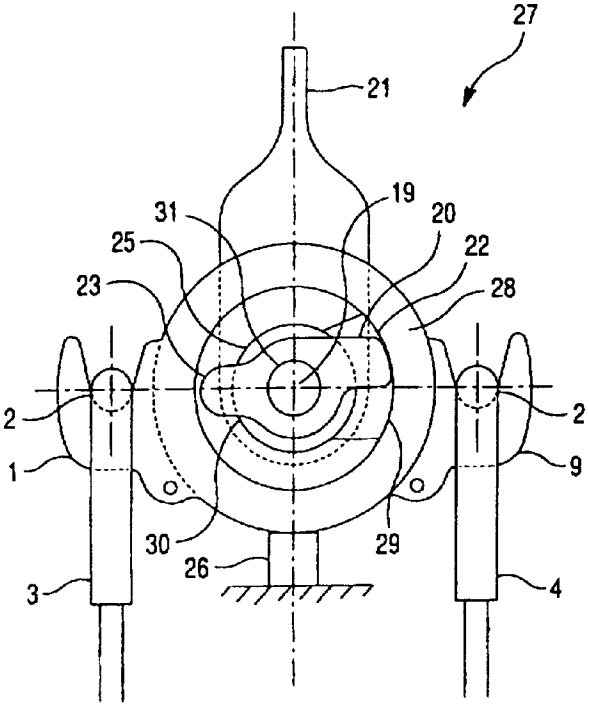
FIG. 3b shows the regulator of FIG. 3a with released blocking system.

As regards the alternative embodiment of FIGS. 3a, 3b and 3c, the locking of the two resetting arms 1, 9 is implemented not by detent action but by the clamping effect of a blocking element 20 acting as the blocking system 28. In this design also the regulator 27 comprises two mutually pivotable resetting arms 1, 9 mounted about a common pivot axis 19 and fitted with retention means 2 for the Bowden cables 3 and 4. This regulator 27 preferably is mounted on the handbrake lever 21. Upon actuation of the handbrake lever 21, the bolt 31 is pulled in the direction of the handbrake lever 21 and thereby also the blocking segment 20, the free end of the blocking element 20 being clamped against the wall 22, in particular the inside wall of the resetting arm 1.

The blocking element 20 rests by means of a beak 23 in an approximately circular clearance 24 of a guidance part 25 inserted into a corresponding clearance of the other resetting arm 9. The resetting arm 9 may also be integral with the guidance part 25.

When the handbrake lever 21 is released, the regulator moves against a stop 26 at the automobile body and thereby the blocking element 20 is pivoted and the clamping against the wall 22 of the resetting arm 1 is eliminated. Accordingly resetting, ie length adjustment, is assured separately for both Bowden cables 3, 4 by means of corresponding pivoting motions of the resetting arms 1 and 9.

Compared with the previous embodiment, the resetting arms 1, 9 can be adjusted in both directions of rotation. If for instance a stop were also provided in the previous embodiment, then bidirectional length adjustment, that is elongation or shortening, would also be possible. This bidirectional adjustment is especially advantageous for instance if the brake shoes were to adhere on account of weather in order that undesired resetting be avoided in such a case.

It is further conceivable as regards the embodiment of FIGS. 3a–3c to mount one resetting arm on each side of the guidance part 25, each resetting arm 1 or 9 being associated with one blocking element 20. The advantage of such a feature is that resetting over a longer path is then possible in frictionally locking manner.

What is claimed is:

1. A regulator (27) automatically controlling length adjustment of a cable (3, 4, 15) to drive a vehicle brake by means of a drive element, said regulator (27) comprising:

first and second pivotally supported resetting arms (1, 9) biased by at least one spring element (13) and having a common pivot axis (19), each resetting arm (1, 9) being connectable to the cable said second resetting arm (9) comprising a radially inwardly facing abutment surface;

a blocking means (28) for at least one of snap fitting and friction fitting engagement with said abutment surface and for blocking relative pivoting motion of the resetting arms (1, 9) upon actuation of said drive element;

wherein the blocking means (28) is displaceable in a radial direction relative to said pivot axis between a blocking and an unblocking position and wherein said blocking means is disposed on said first resetting arm (1) to rotate with said first resetting arm;

wherein the blocking means in the blocking position automatically stops a relative pivoting motion of the resetting arms;

wherein the blocking means in the unblocking position automatically permits a relative pivoting motion of the resetting arms in both directions of rotation about said pivot axis.

2. The regulator as claimed in claim 1, wherein the blocking means (28) is integrated into a clearance (30) of a guidance inset (7).

3. The regulator as claimed in claim 1, wherein the blocking means (28) comprises a blocking segment (8) with outer toothing (10), said blocking segment being displaceably guided along said first resetting arm (1) in a direction radial to the pivot axis (19).

4. The regulator as claimed in claim 3, wherein the second resetting arm (9) comprises inner toothing (11) which, upon actuation of the drive element will engage the outer toothing (10).

5. The regulator as claimed in claim 1, wherein the blocking means (28) is connected to a fastening means (31) for fastening said blocking element to the drive element.

6. The regulator as claimed in claim 5, wherein play is provided between the resetting arms (1, 9) and the fastening means (31) to permit relative translational movement therebetween.

7. The regulator as claimed in claim 1, wherein the first and second resetting arms (1, 9) each are fitted with a lock means for locking said first and second resetting arms (1, 9) against relative rotation to permit ease of assembly of said regulator.

8. The regulator as claimed in claim 7, wherein said lock means comprises a borehole (14) in each of said first and second resetting arms (1, 9), wherein said resetting arms are affixable in a factory-delivery position by means of a stop pin inserted into the borehole (14) against the force of a spring element (13).

9. The regulator as claimed in claim 1, wherein a stop mean is associated with the regulator (27) for disengaging the blocking means (28) when the drive elements is inactivated.

10. The regulator as claimed in claim 9, wherein said stop means is disposed adjacent said regulator to abuts said regulator when the drive element is inactivated.

11. The regulator as claimed in claim 1, wherein said drive element is one of a brake lever and a handbrake lever (21).

12. The regulator as claimed in claim 1, wherein at least one guidance inset is fixedly received in a clearance (5) of said first resetting arm (1).

13. The regulator as claimed in claim 1, wherein at least one guidance inset is irrotationally fixed with respect to said first resetting arm to act as a pivot bearing for the second resetting arm, the second resetting arm being supported by the guidance inset so as to be pivotable about the pivot axis with respect to said first resetting arm.

14. The regulator as claimed in claim 1, wherein the blocking means comprises a blocking element; wherein said blocking element being claimed in the blocking position against a wall of said resetting arm.

15. The regulator according to claim 1, wherein said blocking means moves along a straight line in said radial direction.

16. The regulator according to claim 1, wherein said blocking means is disposed between said resetting arms (1, 9).

17. The regulator according to claim 1, wherein at least one of said resetting arms (1, 9) circumscribes said blocking means.

18. A regulator (27) automatically controlling length adjustment of a cable (3, 4, 15) to drive a vehicle brake by means of a drive element, said regulator (27) comprising:

first and second pivotally supported resetting arms (1, 9) biased by at least one spring element (13) and having a common pivot axis (19), each resetting arm (1, 9) being connectable to the cable;

a blocking means (28) for blocking relative pivoting motion of the resetting arms (1, 9), said blocking means shares said common pivot axis with said resetting arms in one of a blocking position and an unblocking position and is displaced relative to said pivot axis upon actuation of said drive element; wherein the blocking means (28) is displaceable relative to said pivot axis between said blocking and said unblocking position;

wherein the blocking means in the blocking position stops a relative pivoting motion of the resetting arms; and wherein the blocking means in the unblocking position permits a relative pivoting motion of the resetting arms in both directions of rotation about said pivot axis.

* * * * *